(12) United States Patent
Yan

(10) Patent No.: US 12,199,789 B2
(45) Date of Patent: Jan. 14, 2025

(54) OPERATION CONTROL METHOD AND DEVICE, HOUSEHOLD ELECTRICAL APPLIANCE, AND STORAGE MEDIUM

(71) Applicants: GD MIDEA AIR-CONDITIONING EQUIPMENT CO., LTD., Foshan (CN); MIDEA GROUP CO., LTD., Foshan (CN)

(72) Inventor: Lin Yan, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 17/777,570

(22) PCT Filed: Apr. 21, 2020

(86) PCT No.: PCT/CN2020/085899
§ 371 (c)(1),
(2) Date: May 17, 2022

(87) PCT Pub. No.: WO2021/098138
PCT Pub. Date: May 27, 2021

(65) Prior Publication Data
US 2022/0400028 A1 Dec. 15, 2022

(30) Foreign Application Priority Data
Nov. 19, 2019 (CN) .......................... 201911131735.7

(51) Int. Cl.
*H04L 12/28* (2006.01)
*H04L 41/0806* (2022.01)
(Continued)

(52) U.S. Cl.
CPC ...... *H04L 12/2807* (2013.01); *H04L 12/2816* (2013.01); *H04L 12/2821* (2013.01);
(Continued)

(58) Field of Classification Search
CPC ............ H04L 12/2807; H04L 12/2816; H04L 12/2821; H04L 41/0806; H04L 67/1095;
(Continued)

(56) References Cited

U.S. PATENT DOCUMENTS 8,054,744 B1 * 11/2011 Bishara ................. H04L 43/022
370/229
10,944,683 B1 * 3/2021 Roskind .................. H04L 47/58
(Continued)

FOREIGN PATENT DOCUMENTS

| CN | 103021151 A | 4/2013 |
|---|---|---|
| CN | 203554491 U | 4/2014 |

(Continued)

OTHER PUBLICATIONS

World Intellectual Property Organization (WIPO) International Search Report and Written Opinion for PCT/CN2020/085899 Aug. 12, 2020 14 Pages (with translation).
(Continued)

*Primary Examiner* — Thomas J Dailey
(74) *Attorney, Agent, or Firm* — Anova Law Group, PLLC

(57) ABSTRACT

An operation control method for a household electrical appliance includes performing network configuration with a plurality of servers according to different network protocols; upon receiving a control instruction sent by one of the plurality of servers, determining a processing priority of the control instruction; and processing the control instruction according to the processing priority and a preset multi-protocol processing mechanism.

14 Claims, 2 Drawing Sheets

(51) Int. Cl.
*H04L 67/1095* (2022.01)
*H04L 67/125* (2022.01)
*H04L 69/18* (2022.01)

(52) U.S. Cl.
CPC ...... *H04L 41/0806* (2013.01); *H04L 67/1095* (2013.01); *H04L 67/125* (2013.01); *H04L 69/18* (2013.01); *H04L 2012/2849* (2013.01); *H04L 2012/285* (2013.01)

(58) Field of Classification Search
CPC ............... H04L 67/125; H04L 69/18; H04L 2012/2849; H04L 2012/285
See application file for complete search history.

(56) References Cited

U.S. PATENT DOCUMENTS

| | | | | |
|---|---|---|---|---|
| 2015/0078753 | A1* | 3/2015 | Lung | G08C 23/04 398/106 |
| 2016/0105901 | A1* | 4/2016 | Lu | H04L 65/80 370/329 |
| 2018/0092151 | A1* | 3/2018 | Liu | H04W 24/02 |
| 2020/0366737 | A1* | 11/2020 | Florit | H04W 4/18 |

FOREIGN PATENT DOCUMENTS

| | | |
|---|---|---|
| CN | 105609108 A | 5/2016 |
| CN | 105959721 A | 9/2016 |
| CN | 106850361 A | 6/2017 |
| CN | 107222376 A | 9/2017 |
| CN | 107248943 A | 10/2017 |
| CN | 110266567 A | 9/2019 |
| CN | 110855536 A | 2/2020 |
| EP | 3119071 A1 | 1/2017 |
| JP | 2013009033 A | 1/2013 |

OTHER PUBLICATIONS

The China National Intellectual Property Administration (CNIPA) The First Office Action for Chinese Application 201911131735.7 Feb. 8, 2021 12 Pages (With Translation).

The China National Intellectual Property Administration (CNIPA) The Second Office Action for Chinese Application 201911131735.7 May 27, 2021 7 Pages (With Translation).

The China National Intellectual Property Administration (CNIPA) The Search Report for Chinese Application 201911131735.7 Jan. 21, 2021 5 Pages (With Translation).

The European Patent Office (EPO) Extended Search Report for EP Application No. 20890533.1 Dec. 20, 2022 8 Pages.

* cited by examiner

OPERATION CONTROL METHOD AND DEVICE, HOUSEHOLD ELECTRICAL APPLIANCE, AND STORAGE MEDIUM

CROSS-REFERENCE TO RELATED APPLICATIONS

This application is a National Stage Entry under 35 U.S.C. § 371 of International Application No. PCT/CN2020/ 085899, filed on Apr. 21, 2020, which claims priority to Chinese Patent Application No. 201911131735.7, filed with the China National Intellectual Property Administration on Nov. 19, 2019 and entitled "Operation Control Method And Device, Household Electrical Appliance, And Storage Medium," the entire contents of both of which are incorporated herein by reference.

FIELD

The present disclosure relates to the field of control of household electrical appliances, and particularly relates to an operation control method for a household electrical appliance, an operation control device for a household electrical appliance, a household electrical appliance, and a computer readable storage medium.

BACKGROUND

In the related art, in the network environment of household electrical appliances, with the increasing demand for intelligentization, the access to multiple cloud platforms is required to meet the user's control needs based on different platforms. Multi-platform control relies on protocol access to multiple clouds, which, on the one hand, is relatively bloated in implementation and, on the other hand, allows only one protocol to work effectively at one time.

SUMMARY

The present disclosure aims to solve at least one of the technical problems that exist in the existing technologies or in the related art.

To this end, one object of the present disclosure is to propose a novel operation control method for a household electrical appliance.

Another object of the present disclosure is to correspondingly propose an operation control device for a household electrical appliance, a household electrical appliance and a computer readable storage medium.

In order to achieve at least one of the above objects, according to a first aspect of the present disclosure, an operation control method for a household electrical appliance is proposed, which specifically comprises: performing network configuration with multiple servers according to different network protocols; upon the reception of a control instruction sent by any server, determining a processing priority of the control instruction; and processing the control instruction according to the processing priority and a preset multi-protocol processing mechanism.

In this embodiment, the above-mentioned server may specifically be an Internet of Things server, one household electrical appliance may be controlled to operate by multiple different control programs, the different control programs are associated with different Internet of Things servers, and the household electrical appliance needs to be networked with different Internet of Things servers based on different network protocols. Therefore, before the realization of the control function of the control instruction for the household electrical appliance, performing network configuration with multiple servers needs to be performed based on multiple network protocols. After the completion of the network configuration operation and after the reception of a control instruction issued by any Internet of Things server, the processing time of the control instruction is determined based on the processing priority of the control instruction and the multi-protocol processing mechanism to realize the processing of the control instructions issued based on different network protocols, so that multiple protocols can all be valid at the same time, and after the reception of different control instructions issued by different Internet of Things servers, the instructions are executed sequentially based on their processing priorities so as to achieve a multi-protocol response process.

It may be understood by those skilled in the art that the control instruction is an instruction sent by a control terminal to a server and then issued to a household electrical appliance by the server.

In addition, multiple control programs may be installed on one control terminal, or different control programs may be installed on different control terminals.

In the above embodiment, the step of performing network configuration with multiple servers according to different network protocols specifically comprises: in response to a set of network configuration information acquired, associating the network configuration information with multiple network protocols; and triggering each of the network protocols to perform network configuration with a corresponding server.

In this embodiment, in the process of the network configuration operation, the household electrical appliance prestores or acquires multiple network protocols, and after a corresponding set of network configuration information is received based on any network protocol, the network configuration information is shared with the other network protocols to achieve multi-protocol synchronous network access, i.e., to realize the connection of multiple different Internet of Things servers based on a set of network configuration information, thus realizing the slimming processing of the network configuration operation and simplifying the process of network configuration operation.

The network configuration information may be acquired based on control information of a panel of the household electrical appliance, a voice network configuration instruction, a received remote control instruction, etc.

In any of the above embodiments, the step of in response to a set of network configuration information acquired, associating the network configuration information with multiple network protocols specifically comprises: querying the number of the network protocols in response to the network configuration information corresponding to an initial network protocol to determine a storage area corresponding to each of the network protocols; and copying the network configuration information to each storage area to associate the same with the network protocol, and request network configuration with a corresponding server according to the network protocol.

The initial network protocol may be a network protocol triggered based on the above-mentioned control information of the panel of the household electrical appliance, voice network configuration instruction, received remote control instruction, etc.

In this embodiment, on the household electrical appliance side, a network configuration operation is received according to a designated network protocol, and a network configuration request is sent to a control terminal to generate network configuration information based on the network configuration operation and send the network configuration information to a household electrical appliance to be networked. After receiving the network configuration information, the household electrical appliance queries the number of the active protocols that exist locally, finds a valid storage area corresponding to each protocol, and synchronizes the network configuration information to the storage area corresponding to each protocol by copying and sharing the network configuration information, thus enabling further different network configuration operations based on the network configuration information and different network protocols.

In any of the above embodiments, the step of triggering each of the network protocols to perform network configuration with a corresponding server specifically comprises: collecting whether there is a to-be-authenticated protocol that requires security authentication among the multiple network protocols; if a to-be-authenticated protocol is collected, performing a security authentication operation on the to-be-authenticated protocol so as to perform network configuration with a corresponding server after a completion of the security authentication; and for the network protocol that does not require security authentication, directly performing network configuration with a corresponding server.

In this embodiment, if a network protocol is collected to have security characteristics, the protocol needs to pass security authentication in order to be fully started; and for a network protocol that does not need security authentication, a wireless transmission link can be established directly with a corresponding server after the acquisition of the network configuration information in order to enter a state of waiting for a control instruction to wait for different control instructions sent by a terminal, and continuously consume tasks in a preemptive cyclic queue while the protocol is in a state of waiting for a request message, to complete the multi-protocol message processing process.

In any of the above embodiments, the step of upon the reception of a control instruction sent by any server, determining a processing priority of the control instruction specifically comprises: in response to the control instruction, determining a functional type of the control instruction; and determining the processing priority of the control instruction based on the functional type.

In this embodiment, as a strategy for determining the priority, the priority may be determined based on a control purpose of the control instruction itself. For example, for the general power-on instruction, the highest priority is required, and if the household electrical appliance is not turned on, any other control instruction cannot be executed normally. In addition, the priorities of the other control instructions are further ordered based on different types of household electrical appliances. Taking an air conditioner as an example, the highest priority is given to the power-on and power-off instructions, followed by mode adjustment (such as cooling or heating, etc.), followed by the control instructions of specific parameters (such as temperature adjustment instructions, air flow speed adjustment instructions, air outlet direction adjustment instructions, etc.), and then other auxiliary control instructions such as timing, dehumidification, dust removal, etc.

Determining the processing priority of the control instruction based on the functional type can meet, to the greatest extent, the user's needs for controlling the household electrical appliance, while realizing the multi-protocol processing mechanism.

In any of the above embodiments, the step of upon the reception of a control instruction sent by any server, determining a processing priority of the control instruction specifically comprises: in response to the control instruction, determining dwell durations of multiple unexecuted control instructions in a task queue of the household electrical appliance; and determining the processing priorities of the control instructions according to the dwell durations thereof.

In this embodiment, as another strategy for determining the priority, the processing priority may also be determined based on the dwell duration of the control instruction in the task queue, and the longer the dwell duration, the higher the processing priority, which can realize time-order based control instruction processing logic while realizing the multi-protocol processing mechanism.

Specifically, further, it is also feasible to further collect whether the dwell duration reaches a duration threshold, and trigger the execution of the control instruction when the dwell duration reaches the duration threshold.

In any of the above embodiments, the step of upon the reception of a control instruction sent by any server, determining a processing priority of the control instruction specifically comprises: in response to the control instruction, determining the network protocol to which the control instruction belongs; and determining the processing priority of the control instruction according to a preset priority of the network protocol.

In this embodiment, as a further strategy for determining the priority, the priority of the control instruction may also be determined based on the priority of the corresponding network protocol itself. For example, the priority of the network protocol can be determined based on the sequence of time stamp of the network protocol, so as to determine the priority of the control instruction transmitted under the protocol based on the priority of the network protocol.

In any of the above embodiments, the step of processing the control instruction according to the processing priority and a preset multi-protocol processing mechanism specifically comprises: processing the control instruction according to the processing priority and a preemptive processing mechanism.

In any of the above embodiments, the step of processing the control instruction according to the processing priority and a preemptive processing mechanism specifically comprises: controlling to execute a designated control instruction with a highest priority; and during an execution of the designated control instruction, if a real-time control instruction with a higher priority is received, controlling to stop the process of the designated control instruction and controlling to execute the real-time control instruction.

In this embodiment, the preemptive processing mechanism is to assign the processing mechanism to a process with the highest priority such that it is executed, and as soon as another process with a higher priority appears during the execution, a process scheduler stops the current process to execute the control instruction with a higher processing priority.

Specifically, after receiving a control instruction from a server, the household electrical appliance determines the processing priority control instruction of the control instruction based on any of the above strategies, and then inserts the control instruction into a preemptive cyclic message queue. For the messages in the message queue, the priority control instruction information thereof is continuously updated according to the factors such as the types of the messages, the original priority control instructions of the messages, and the dwell durations of the messages in the queue. In the preemptive cyclic message queue, a processing request of a message of a high-priority control instruction will preempt the processing request process of a message of a low-priority control instruction, and the message of a low-priority control instruction is processed after the processing of the message of a high-priority control instruction has been completed.

In any of the above embodiments, the method further comprises: collecting that the number of the to-be-executed control instructions in the task queue reaches a preset peak; and if a real-time control instruction is further received, determining whether to override one of the to-be-executed control instructions with the lowest priority according to the priority of the real-time control instruction.

In this embodiment, in the message queue, when the number of the messages in the queue reaches a peak, the messages added to the queue at a later stage will override the messages added to the queue at an earlier stage to form a cyclic queuing process so as to achieve real-time updating of the cyclic queue, which enables a control instruction with a high processing priority to have a greater probability of being executed.

According to an embodiment of a second aspect of the present disclosure, an operation control device for a household electrical appliance is provided, which comprises: a memory and a processor, the memory is used for storing program codes; and the processor is used for executing the steps of the operation control method for a household electrical appliance according to any of the embodiments of the first aspect of the present disclosure.

According to an embodiment of a third aspect of the present disclosure, a household electrical appliance is provided, which comprises: an execution body, and any operation control device for a household electrical appliance as described in the second aspect, wherein the operation control device is used for controlling the execution body to execute a control instruction.

The household electrical appliance includes at least one of an air conditioner, a refrigerator, a fan, a washing machine, a television, or a sound device.

According to an embodiment of a fourth aspect of the present disclosure, a computer readable storage medium is provided, on which a computer program is stored, when the computer program is executed by a processor, the steps of the operation control method according to any one of the embodiments of the first aspect being implemented.

Additional aspects and advantages of the present disclosure will become apparent in the following description, or are understood by the practice of the present disclosure.

BRIEF DESCRIPTION OF THE DRAWINGS

The above and/or additional aspects and advantages of the present disclosure will become apparent and readily understood from the following description of embodiments in conjunction with the drawings, wherein.

DETAILED DESCRIPTION OF THE DISCLOSURE

In order that the above-mentioned objectives, features and advantages of the present disclosure can be understood more clearly, a further detailed description of the present disclosure will be given below in connection with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

Embodiments of the present disclosure provide an operation control method for a household electrical appliance, an operation control device for a household electrical appliance, a household electrical appliance, and a computer readable storage medium.

The operation control method for a household electrical appliance described in an embodiment of the present disclosure may be implemented based on three-way interaction between a control terminal, a server and the household electrical appliance. The control terminal can be a cell phone or a remote control.

Figure 1:
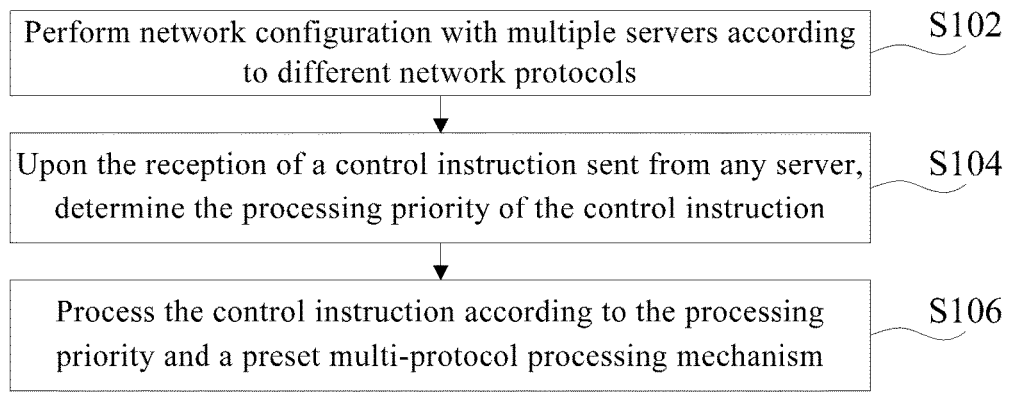
FIG. 1 is a flow diagram of an operational control method according to an embodiment of the present disclosure.

As shown in FIG. 1, the operation control method according to an embodiment of the present disclosure comprises:

Step 102, performing network configuration with multiple servers according to different network protocols.

The household electrical appliance is provided with a network configuration module such as Wi-Fi, the network configuration operation is realized based on the information interaction between the household electrical appliance and the servers, and the above servers may specifically be Internet of Things servers.

Step 104, upon the reception of a control instruction sent by any server, determining a processing priority of the control instruction.

It may be understood by those skilled in the art that the control instruction is an instruction sent by a control terminal to a server and then issued to a household electrical appliance by the server.

Step 106, processing the control instruction according to the processing priority and a preset multi-protocol processing mechanism.

In this embodiment, one household electrical appliance may be controlled to operate by multiple different control programs, the different control programs are associated with different Internet of Things servers, and the household electrical appliance needs to be networked with different Internet of Things servers based on different network protocols. Therefore, before the realization of the control function of the control instruction for the household electrical appliance, performing network configuration with multiple servers needs to be performed based on multiple network protocols. After the completion of the network configuration operation and after the reception of a control instruction issued by any Internet of Things server, the processing time of the control instruction is determined based on the processing priority of the control instruction and the multi-protocol processing mechanism to realize the processing of the control instructions issued based on different network protocols, so that multiple protocols can all be valid at the same time, and after the reception of different control instructions issued by different Internet of Things servers, the instructions are executed sequentially based on their processing priorities so as to achieve a multi-protocol response process.

Multiple control programs may be installed on one control terminal, or different control programs may be installed on different control terminals.

In some embodiments, the above step 102 may be comprises: in response to a set of network configuration information acquired, associating the network configuration information with multiple network protocols; and triggering each of the network protocols to perform network configuration with a corresponding server.

The network configuration information can be generated based on an initial network protocol.

In this embodiment, in the process of the network configuration operation, the household electrical appliance pre-stores or acquires multiple network protocols, and after a corresponding set of network configuration information is received based on any network protocol, the network configuration information is shared with the other network protocols to achieve multi-protocol synchronous network access, i.e., to realize the connection of multiple different Internet of Things servers based on a set of network configuration information, thus realizing the slimming processing of the network configuration operation and simplifying the process of network configuration operation.

In a possible implementation, the step of in response to a set of network configuration information acquired, associating the network configuration information with multiple network protocols specifically comprises: querying the number of the network protocols in response to the network configuration information corresponding to the initial network protocol to determine a storage area corresponding to each of the network protocols; and copying the network configuration information to each storage area to associate the same with the network protocol, and request network configuration with a corresponding server according to the network protocol.

In this embodiment, on the household electrical appliance side, a network configuration operation is received according to a designated network protocol, to generate network configuration information based on the network configuration operation and send the network configuration information to a household electrical appliance to be networked. After receiving the network configuration information, the household electrical appliance queries the number of the active protocols that exist locally, finds a valid storage area corresponding to each protocol, and synchronizes the network configuration information to the storage area corresponding to each protocol by copying and sharing the network configuration information, thus enabling further different network configuration operations based on the network configuration information and different network protocols.

In any of the above embodiments, the step of triggering each of the network protocols to perform network configuration with a corresponding server specifically comprises: collecting whether there is a to-be-authenticated protocol that requires security authentication among the multiple network protocols; if a to-be-authenticated protocol is collected, performing a security authentication operation on the to-be-authenticated protocol so as to perform network configuration with a corresponding server after a completion of the security authentication; and for the network protocol that does not require security authentication, directly performing network configuration with a corresponding server.

In this embodiment, if a network protocol is collected to have security characteristics, the protocol needs to pass security authentication in order to be fully started; and for a network protocol that does not need security authentication, a wireless transmission link can be established directly with a corresponding server after the acquisition of the network configuration information in order to enter a state of waiting for a control instruction to wait for different control instructions sent by a terminal, and continuously consume tasks in a preemptive cyclic queue while the protocol is in a state of waiting for a request message, to complete the multi-protocol message processing process.

In some embodiments, a possible implementation of the above step 104 comprises: in response to the control instruction, determining a functional type of the control instruction; and determining the processing priority of the control instruction based on the functional type.

In this embodiment, as a strategy for determining the priority, the priority may be determined based on a control purpose of the control instruction itself. For example, for the general power-on instruction, the highest priority is required, and if the household electrical appliance is not turned on, any other control instruction cannot be executed normally. In addition, the priorities of the other control instructions are further ordered based on different types of household electrical appliances. Taking an air conditioner as an example, the highest priority is given to the power-on and power-off instructions, followed by mode adjustment (such as cooling or heating, etc.), followed by the control instructions of specific parameters (such as temperature adjustment instructions, air flow speed adjustment instructions, air outlet direction adjustment instructions, etc.), and then other auxiliary control instructions such as timing, dehumidification, dust removal, etc.

Determining the processing priority of the control instruction based on the functional type can meet, to the greatest extent, the user's needs for controlling the household electrical appliance, while realizing the multi-protocol processing mechanism.

In some embodiments, another possible implementation of the above step 104 comprises: in response to the control instruction, determining dwell durations of multiple unexecuted control instructions in a task queue of the household electrical appliance; and determining the processing priorities of the control instructions according to the dwell durations thereof.

In this embodiment, as another strategy for determining the priority, the processing priority may also be determined based on the dwell duration of the control instruction in the task queue, and the longer the dwell duration, the higher the processing priority, which can realize time-order based control instruction processing logic while realizing the multi-protocol processing mechanism.

Specifically, further, it is also feasible to further collect whether the dwell duration reaches a duration threshold, and trigger the execution of the control instruction when the dwell duration reaches the duration threshold.

In some embodiments, a further possible implementation of the above step 104 comprises: in response to the control instruction, determining the network protocol to which the control instruction belongs; and determining the processing priority of the control instruction according to a preset priority of the network protocol.

In this embodiment, as a further strategy for determining the priority, the priority of the control instruction may also be determined based on the priority of the corresponding network protocol itself. For example, the priority of the network protocol can be determined based on the sequence of time stamp of the network protocol, so as to determine the priority of the control instruction transmitted under the protocol based on the priority of the network protocol.

In some embodiments, a possible implementation of the above step 106 comprises: processing the control instruction according to the processing priority and a preemptive processing mechanism.

In any of the above embodiments, the step of processing the control instruction according to the processing priority and a preemptive processing mechanism specifically comprises: controlling to execute a designated control instruction with a highest priority; and during an execution of the designated control instruction, if a real-time control instruction with a higher priority is received, controlling to stop the process of the designated control instruction and controlling to execute the real-time control instruction.

In this embodiment, the preemptive processing mechanism is to assign the processing mechanism to a process with the highest priority such that it is executed, and as soon as another process with a higher priority appears during the execution, a process scheduler stops the current process to execute the control instruction with a higher processing priority.

Specifically, after receiving a control instruction from a server, the household electrical appliance determines the processing priority control instruction of the control instruction based on any of the above strategies, and then inserts the control instruction into a preemptive cyclic message queue. For the messages in the message queue, the priority control instruction information thereof is continuously updated according to the factors such as the types of the messages, the original priority control instructions of the messages, and the dwell durations of the messages in the queue. In the preemptive cyclic message queue, a processing request of a message of a high-priority control instruction will preempt the processing request process of a message of a low-priority control instruction, and the message of a low-priority control instruction is processed after the processing of the message of a high-priority control instruction has been completed.

In any of the above embodiments, the method further comprises: collecting that the number of the to-be-executed control instructions in the task queue reaches a preset peak; and if a real-time control instruction is further received, determining whether to override one of the to-be-executed control instructions with the lowest priority according to the priority of the real-time control instruction.

In this embodiment, in the message queue, when the number of the messages in the queue reaches a peak, the messages added to the queue at a later stage will override the messages added to the queue at an earlier stage to form a cyclic queuing process so as to achieve real-time updating of the cyclic queue, which enables a control instruction with a high processing priority to have a greater probability of being executed.

Figure 2:
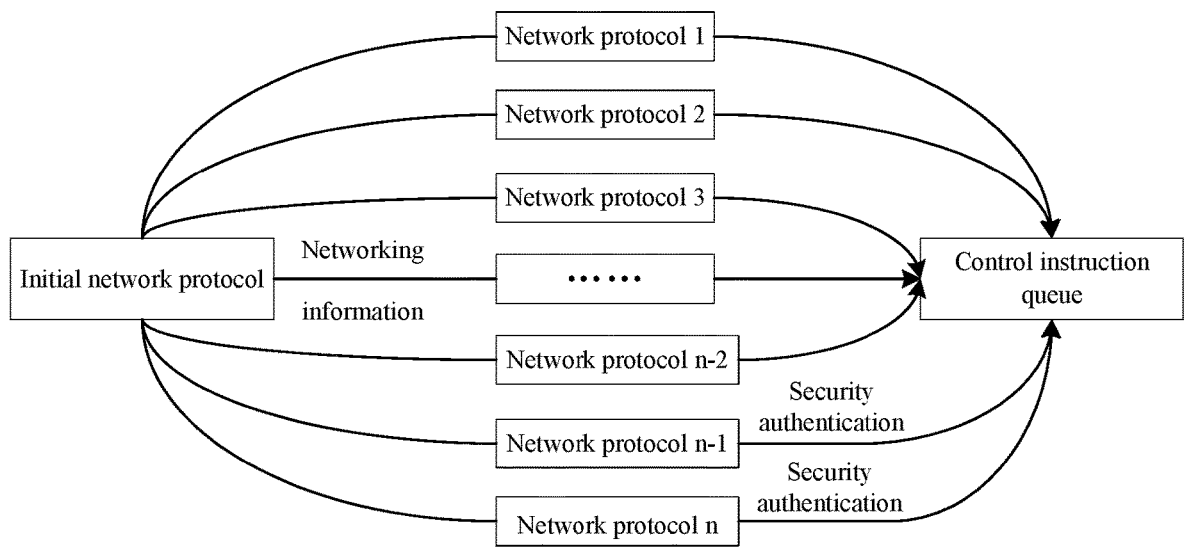
FIG. 2 is a schematic diagram of network access initiation of a network protocol according to an embodiment of the present disclosure.

As shown in FIG. 2, the network configuration process in an operation control solution according to an embodiment of the present disclosure includes a plurality of network protocols, and specifically includes the followings.

The process proceeds to a network configuration mode through control information of the panel of the household electrical appliance, a voice network configuration instruction, a received remote control instruction, etc.

As shown in FIG. 2, the household electrical appliance sends a network configuration request to a control terminal according to an initial network protocol, to cause the control terminal to generate network configuration information based on an initial control program corresponding to the initial network protocol.

The household electrical appliance receives the network configuration information, queries the number of the active protocols that exist locally, and finds a valid storage area corresponding to each protocol.

The network configuration information is copied and shared to be synchronized to the storage area corresponding to each protocol, thus enabling further different network configuration operations based on the network configuration information and different network protocols.

When the starting of any protocol is completed, the process will enter a state of waiting for a control instruction to wait for various operation control requests from the user side.

While the protocol is in the state of waiting for a control instruction, tasks in a preemptive cyclic queue are continuously consumed, e.g., the multi-protocol message processing process.

Figure 3:
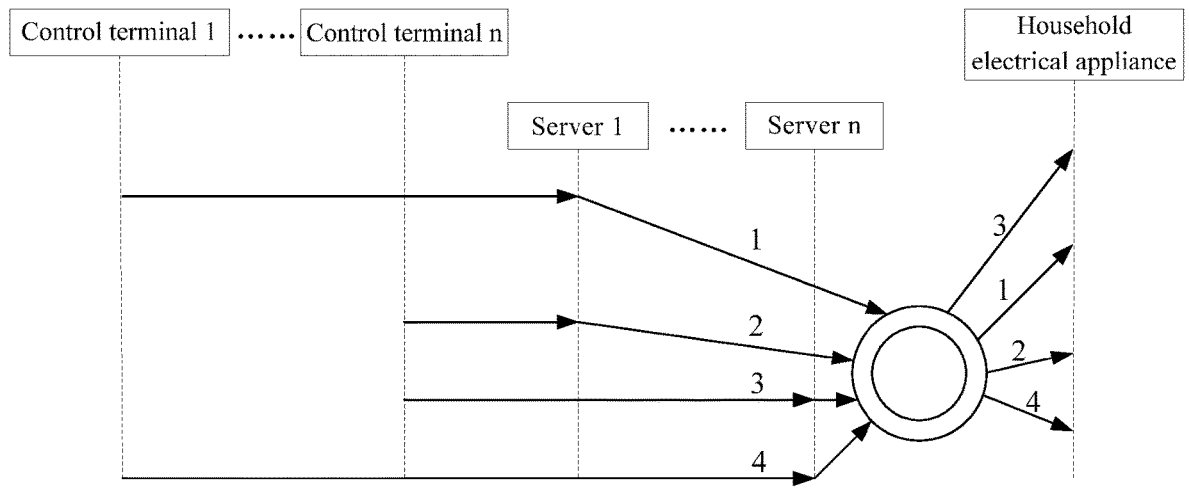
FIG. 3 is a schematic diagram of control logic of a multi-protocol architecture according to an embodiment of the present disclosure.

The circular structure in FIG. 3 represents a preemptive circular message queue. The multi-protocol message processing process in an operation control solution according to an embodiment of the present disclosure includes the followings.

A user sends, through a control terminal (e.g., a smart phone), a control request for operating a household electrical appliance.

The control request is sent to a corresponding server according to a corresponding protocol type (as shown in FIG. 3, from the control terminal 1 to the server 1, from the control terminal 1 to the server n, from the control terminal n to the server n, from the control terminal n to the server 1, etc.).

Upon the reception of the control request, the server generates a control instruction capable of directly controlling the smart household electrical appliance.

The server sends the control instruction for the smart household electrical appliance to the corresponding household electrical appliance through the internetwork.

After receiving the control instruction from the server side, the household electrical appliance calculates a priority for the message, and then inserts it into the preemptive cyclic message queue.

For the messages in the message queue, the priority information thereof is continuously updated according to the factors such as the types of the messages, the original priorities of the messages, and the dwell durations of the messages in the queue.

As shown in FIG. 3, in the preemptive cyclic message queue, a processing request of a high-priority message will preempt the processing request process of a low-priority message, and the low-priority message is processed after the processing of the high-priority message has been completed.

In the message queue, when the number of the messages in the queue reaches a peak, the messages added to the queue at a later stage will override the messages added to the queue at an earlier stage to form a cyclic queuing process.

The process in which the smart household electrical appliance continuously acquires messages from the message queue, drops the messages and processes the messages is specifically as shown in FIG. 3.

Figure 4:
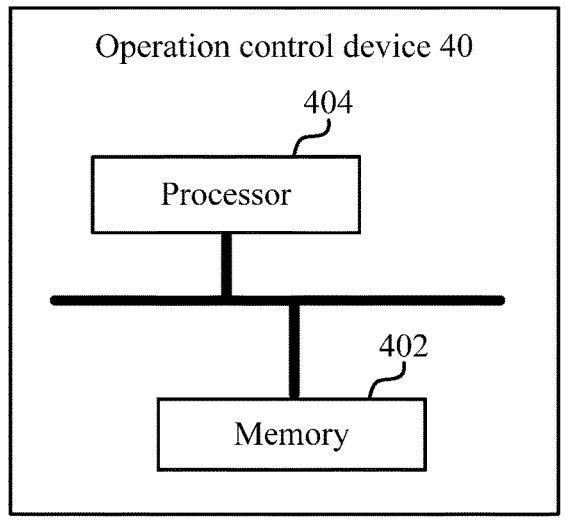
FIG. 4 is a schematic block diagram of an operational control device according to an embodiment of the present disclosure.

As shown in FIG. 4, the operation control device 40 according to an embodiment of the present disclosure comprises: a memory 402 and a processor 404, the memory 402 being connected to the processor 404 via a bus.

The memory 402 is used for storing program codes; and the processor 404 is used for calling the program codes to execute the operation control method for a household electrical appliance described in any of the above embodiments.

The processor 404 may be a Central Processing Unit (CPU), and the processor 404 may also be other general-purpose processors, a Digital Signal Processor (DSP), an Application Specific Integrated Circuit (ASIC), a Field-Programmable Gate Array (FPGA) or other programmable logic devices, a discrete gate or transistor logic device, a discrete hardware component, etc. The general-purpose processor may be a microprocessor, or the processor may also be any conventional processor, etc.

Figure 5:
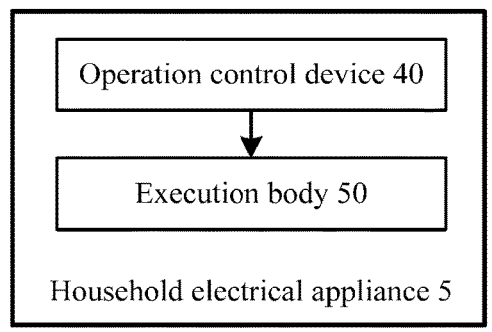
FIG. 5 is a schematic block diagram of a household electrical appliance according to an embodiment of the present disclosure.

As shown in FIG. 5, a household electrical appliance 5 according to an embodiment of the present disclosure comprises an execution body 50 and the operation control device 40 described in the above embodiment. The operation control device 40 is used for controlling the execution body 50 to execute a control instruction.

The household electrical appliance includes at least one of an air conditioner, a refrigerator, a fan, a washing machine, a television, or sound device.

In this embodiment, the household electrical appliance comprises any of the above-mentioned operation control devices, and therefore has all the beneficial technical effects of the operation control device, which will not be repeated here.

In an embodiment of the present disclosure, a computer readable storage medium is provided, on which a computer program is stored, when the computer program is executed by a processor, the steps of the control method for a household electrical appliance described in any of the above embodiments being implemented.

In this embodiment, when the computer program is executed by a processor, the steps of the control method for a household electrical appliance described in any of the above embodiments is implemented. Therefore, the computer program has all the beneficial technical effects of the control method for a household electrical appliance, which will not be repeated here.

Those skilled in the art should understand that embodiments of the present disclosure may be provided as methods, systems, or computer program products. Accordingly, the present disclosure may take the form of entirely hardware embodiments, entirely software embodiments, or embodiments combining software and hardware aspects. Moreover, the present disclosure may take the form of a computer program product implemented on one or more computer-usable storage media (including, but not limited to, disk memory, CD-ROM, optical memory, etc.) containing computer-usable program codes.

The present disclosure is described with reference to flowcharts and/or block diagrams of methods, devices (systems), and computer program products according to the embodiments of the present disclosure. It should be understood that each process and/or block in the flowcharts and/or block diagrams, and combinations of the processes and/or blocks in the flowcharts and/or block diagrams may be implemented by computer program instructions. These computer program instructions may be provided to a processor of a general-purpose computer, a specialized computer, an embedded processing machine, or other programmable data processing devices to produce a machine to cause the instructions executed by the processor of the computer or other programmable data processing devices to produce a device for implementing the functions specified in one process or multiple processes of the flowcharts and/or one block or multiple blocks of the block diagrams.

These computer program instructions may also be stored in a computer readable memory capable of directing a computer or other programmable data processing devices to operate in a particular manner, such that the instructions stored in the computer readable memory produce an article of manufacture comprising an instruction device that implements the functions specified in one process or multiple processes of the flowcharts and/or one block or multiple blocks of the block diagrams.

These computer program instructions may also be loaded onto a computer or other programmable data processing devices, such that a series of operational steps are performed on the computer or other programmable devices to produce computer-implemented processing such that the instructions executed on the computer or other programmable devices provide steps for implementing the functions specified in one process or multiple processes of the flowcharts and/or one block or multiple blocks of the block diagrams.

It should be noted that any reference sign in the parentheses in a claim should not be constructed as a limitation on the claim. The word "comprising" does not exclude the existence of components or steps not listed in the claims. The word "a" or "one" preceding a component does not exclude the existence of multiple such components. The present disclosure may be implemented with the aid of hardware comprising several different components and with the aid of a computer suitably programmed. In a unit claim listing several devices, several of these devices may be specifically embodied by the same hardware item. The use of the words "first," "second," "third," etc. does not indicate any order. These words may be interpreted as names.

Although preferred embodiments of the present disclosure have been described, those skilled in the art may make additional changes and modifications to these embodiments once the basic inventive concepts are known. Therefore, the appended claims are intended to be construed to include the preferred embodiments and all changes and modifications that fall within the scope of the present disclosure.

The descriptions above are only preferred embodiments of the present disclosure, which are not used to limit the present disclosure. For those skilled in the art, the present disclosure may have various changes and variations. Any modifications, equivalent substitutions, improvements etc. within the spirit and principle of the present disclosure shall all be included in the protection scope of the present disclosure.

What is claimed is:

1. An operation control method for a household electrical appliance comprising:
    performing network configuration with a plurality of servers according to different network protocols, including:
        in response to a set of network configuration information acquired for an initial network protocol among a plurality of network protocols, sharing the set of network configuration information over the plurality of network protocols, wherein sharing the set of network configuration information includes:
            determining storage areas each corresponding to the plurality of network protocols, respectively; and copying the set of network configuration information to the storage areas to share the set of network configuration information over the plurality of network protocols; and triggering each of the network protocols to perform network configuration with a corresponding server of the plurality of servers;

upon receiving a control instruction sent by one of the plurality of servers, determining a processing priority of the control instruction; and processing the control instruction according to the processing priority and a preset multi-protocol processing mechanism.

2. The method according to claim 1, wherein triggering each of the network protocols to perform network configuration with the corresponding server includes:

for a network protocol that requires security authentication, performing a security authentication operation and performing network configuration with the corresponding server after the security authentication operation is completed; and for a network protocol that does not require security authentication, directly performing network configuration with the corresponding server.

3. The method according to claim 1, wherein upon receiving the control instruction, determining the processing priority of the control instruction includes:

in response to the control instruction, determining a functional type of the control instruction; and determining the processing priority of the control instruction based on the functional type.

4. The method according to claim 1, wherein upon receiving the control instruction, determining the processing priority of the control instruction includes:

in response to the control instruction, determining dwell durations of a plurality of unexecuted control instructions in a task queue of the household electrical appliance; and determining processing priorities of the unexecuted control instructions according to the dwell durations.

5. The method according to claim 1, wherein upon receiving the control instruction, determining the processing priority of the control instruction includes:

in response to the control instruction, determining the network protocol to which the control instruction belongs; and determining the processing priority of the control instruction according to a preset priority of the network protocol.

6. The method according to claim 1, wherein processing the control instruction according to the processing priority and the preset multi-protocol processing mechanism includes:

processing the control instruction according to the processing priority and a preemptive processing mechanism.

7. The method according to claim 6, wherein processing the control instruction according to the processing priority and the preemptive processing mechanism includes:

controlling to execute a designated control instruction with a highest priority; and during execution of the designated control instruction, in response to receiving a real-time control instruction with a higher priority, controlling to stop a process of the designated control instruction and controlling to execute the real-time control instruction.

8. The method according to claim 6, further comprising:

determining that a number of to-be-executed control instructions in a task queue of the household electrical appliance reaches a preset peak; and in response to receiving a real-time control instruction, determining whether to override one of the to-be-executed control instructions with a lowest priority according to the priority of the real-time control instruction.

9. A non-transitory computer readable storage medium storing an operation control program that, when being executed by a processor, causing the processor to perform the method according to claim 1.

10. An operation control device for a household electrical appliance comprising:

a memory storing program codes; and a processor configured to execute the program codes to:

perform network configuration with a plurality of servers according to different network protocols, including:

in response to a set of network configuration information acquired for an initial network protocol among a plurality of network protocols, sharing the set of network configuration information over the plurality of network protocols, wherein sharing the set of network configuration information includes:

determining storage areas corresponding to the plurality of network protocols, respectively; and copying the set of network configuration information to the storage areas to share the set of network configuration information over the plurality of network protocols; and triggering each of the plurality of network protocols to perform network configuration with a corresponding server of the plurality of servers;

upon receiving a control instruction sent by one of the plurality of servers, determine a processing priority of the control instruction; and process the control instruction according to the processing priority and a preset multi-protocol processing mechanism.

11. The device according to claim 10, wherein the processor is further configured to execute the program codes to:

for a network protocol that requires security authentication, perform a security authentication operation and performing network configuration with the corresponding server after the security authentication operation is completed; and for a network protocol that does not require security authentication, directly perform network configuration with the corresponding server.

12. The device according to claim 10, wherein the processor is further configured to execute the program codes to:

in response to the control instruction, determine a functional type of the control instruction; and determine the processing priority of the control instruction based on the functional type.

13. The device according to claim 10, wherein the processor is further configured to execute the program codes to:

in response to the control instruction, determine dwell durations of a plurality of unexecuted control instructions in a task queue of the household electrical appliance; and determine processing priorities of the unexecuted control instructions according to the dwell durations.

14. The method according to claim 1, wherein upon receiving the control instruction, determining the processing priority of the control instruction includes:
- in response to the control instruction, determine the network protocol to which the control instruction belongs; and
- determine the processing priority of the control instruction according to a preset priority of the network protocol.

* * * * *